US 6,577,316 B2

(12) United States Patent
Brethour et al.

(10) Patent No.: US 6,577,316 B2
(45) Date of Patent: Jun. 10, 2003

(54) WIDE INSTRUCTION WORD GRAPHICS PROCESSOR

(75) Inventors: Vernon Brethour, Owens Cross Roads, AL (US); Dale Kirkland, Madison, AL (US); William Lazenby, Madison, AL (US); Gary Shelton, Huntsville, AL (US)

(73) Assignee: 3Dlabs, Inc., Ltd, Hamilton (BM)

( * ) Notice: Subject to any disclaimer, the term of this patent is extended or adjusted under 35 U.S.C. 154(b) by 0 days.

(21) Appl. No.: 09/353,420

(22) Filed: Jul. 15, 1999

(65) Prior Publication Data

US 2002/0030685 A1 Mar. 14, 2002

Related U.S. Application Data

(60) Provisional application No. 60/093,165, filed on Jul. 17, 1998.

(51) Int. Cl.[7] .............................................. G06F 15/80
(52) U.S. Cl. ....................... 345/505; 709/107; 713/502; 345/541
(58) Field of Search ................................. 345/501–503, 345/505, 507–509, 513, 515, 516, 521, 522, 541, 540; 709/400, 103, 107; 710/131, 132, 305, 306, 309, 310; 712/203, 214, 215; 713/400, 501, 502, 600; 711/154, 157

(56) References Cited

U.S. PATENT DOCUMENTS

| | | | |
|---|---|---|---|
| 3,689,895 A | 9/1972 | Kitamura | 340/172.5 |
| 3,980,992 A | 9/1976 | Levy et al. | 340/172.5 |
| 4,434,437 A | 2/1984 | Strolle et al. | 358/140 |
| 4,484,299 A | 11/1984 | Lambourn et al. | 364/724 |
| 4,604,695 A | 8/1986 | Widen et al. | 364/200 |
| 4,615,013 A | 9/1986 | Yan et al. | 364/521 |
| 4,646,232 A | 2/1987 | Chang et al. | 364/200 |
| 4,908,780 A | 3/1990 | Priem et al. | 364/521 |
| 4,918,626 A | 4/1990 | Watkins et al. | 364/522 |
| 4,991,122 A | 2/1991 | Sanders | 364/521 |
| 5,107,415 A | 4/1992 | Sato et al. | 395/800 |
| 5,123,085 A | 6/1992 | Wells et al. | 395/121 |
| 5,239,654 A | 8/1993 | Ing-Simmons et al. | 395/800 |
| 5,287,438 A | 2/1994 | Kelleher | 395/132 |
| 5,293,480 A | 3/1994 | Miller et al. | 395/163 |
| 5,313,551 A | 5/1994 | Labrousse et al. | 395/425 |
| 5,329,615 A | 7/1994 | Peaslee et al. | 395/162 |
| 5,363,475 A | 11/1994 | Baker et al. | 395/122 |
| 5,371,840 A | 12/1994 | Fischer et al. | 395/133 |
| 5,394,524 A | 2/1995 | DiNicola et al. | 395/163 |
| 5,398,328 A | 3/1995 | Weber et al. | 395/500 |
| 5,440,682 A | 8/1995 | Deering | 395/162 |
| 5,446,479 A | 8/1995 | Thompson et al. | 345/139 |
| 5,446,859 A | 8/1995 | Shin et al. | 395/427 |

(List continued on next page.)

FOREIGN PATENT DOCUMENTS

| | | |
|---|---|---|
| EP | 0 311 798 A2 | 4/1989 |
| EP | 0 397 180 A2 | 11/1990 |
| EP | 0 438 194 A2 | 7/1991 |

(List continued on next page.)

OTHER PUBLICATIONS

"A Single–Chip Multiprocessor For Muttimedia: The MVP," Guttag et al., IEEE Computer Graphics and Applications, vol. 12, 155.6, Nov. 1992, pp. 53–64.

(List continued on next page.)

Primary Examiner—Kee M. Tung
(74) Attorney, Agent, or Firm—Arnall Golden Gregory LLP

(57) ABSTRACT

A graphics accelerator includes a vertex input for receiving vertex data, an output for forwarding processed data, and a processor coupled with the vertex input and output. The graphics accelerator also includes an instruction input that receives instructions for processing the vertex data received from the vertex input. The processor is responsive to wide word instructions.

13 Claims, 3 Drawing Sheets

U.S. PATENT DOCUMENTS

| | | | |
|---|---|---|---|
| 5,463,747 A | 10/1995 | Iwata et al. | 395/375 |
| 5,485,559 A | 1/1996 | Sakaibara et al. | 395/133 |
| 5,511,165 A | 4/1996 | Brady et al. | 395/200.01 |
| 5,519,823 A | 5/1996 | Barkans | 395/143 |
| 5,544,294 A | 8/1996 | Cho et al. | 395/141 |
| 5,555,359 A | 9/1996 | Choi et al. | 395/141 |
| 5,557,734 A | 9/1996 | Wilson | 395/162 |
| 5,561,749 A | 10/1996 | Schroeder | 395/120 |
| 5,568,631 A * | 10/1996 | Webb | 364/228 |
| 5,572,713 A | 11/1996 | Weber et al. | 395/500 |
| 5,631,693 A | 5/1997 | Wunderlich et al. | 348/7 |
| 5,664,114 A | 9/1997 | Krech, Jr. et al. | 395/200.64 |
| 5,666,510 A | 9/1997 | Mitsuishi et al. | 711/220 |
| 5,666,520 A | 9/1997 | Fujita et al. | 345/513 |
| 5,684,939 A | 11/1997 | Foran et al. | 395/131 |
| 5,701,365 A | 12/1997 | Harrington et al. | 382/212 |
| 5,706,481 A | 1/1998 | Hannah et al. | 395/519 |
| 5,717,908 A | 2/1998 | Dulong | 395/562 |
| 5,720,019 A * | 2/1998 | Koss et al. | 345/434 |
| 5,721,812 A | 2/1998 | Mochizuki | 395/110 |
| 5,737,455 A | 4/1998 | Harrington et al. | 382/284 |
| 5,757,375 A | 5/1998 | Kawase | 345/429 |
| 5,757,385 A | 5/1998 | Narayanaswami et al. | 345/505 |
| 5,764,237 A | 6/1998 | Kaneko | 345/430 |
| 5,821,950 A | 10/1998 | Rentschler et al. | 345/505 |
| 5,841,444 A | 11/1998 | Mun et al. | 345/506 |
| 5,870,567 A | 2/1999 | Hausauer et al. | 395/281 |
| 5,883,641 A | 3/1999 | Krech, Jr. et al. | 345/505 |
| 5,914,711 A | 6/1999 | Mangerson et al. | 345/203 |
| 5,925,123 A * | 7/1999 | Tremblay et al. | 712/212 |
| 5,949,423 A * | 9/1999 | Olsen | 345/422 |
| 5,956,047 A * | 9/1999 | Krech, Jr. et al. | 345/503 |

FOREIGN PATENT DOCUMENTS

| | | |
|---|---|---|
| EP | 0 448 286 A2 | 9/1991 |
| EP | 0 463 700 A2 | 1/1992 |
| EP | 0 566 229 A2 | 10/1993 |
| EP | 0 627 682 A1 | 12/1994 |
| EP | 0 631 252 A2 | 12/1994 |
| EP | 0 693 737 A2 | 1/1996 |
| EP | 0 734 008 A1 | 9/1996 |
| EP | 0 735 463 A2 | 10/1996 |
| EP | 0 810 553 A2 | 12/1997 |
| EP | 0 817 009 A2 | 1/1998 |
| EP | 0 825 550 A2 | 2/1998 |
| EP | 0 840 279 A2 | 5/1998 |
| WO | WO 86/07646 | 12/1986 |
| WO | WO 92/00570 | 1/1992 |
| WO | WO 93/06553 | 4/1993 |
| WO | WO 97/21192 | 6/1997 |

OTHER PUBLICATIONS

"Microprogram Sequencer Handles a System's Interrupts in Real Time," Mithani et al., Advanced Micro Devices Inc., Jan. 10, 1985, pp. 319–328.

"A Fine Grained Data Flow Machine and Its Concurrent Execution Mechanism," Iwashita et al., C&C Information Technology Research Labs, Apr. 1989, pp. 63–72.

"A Dataflow Image Processing System TIP–4," Fujita et al., C&C Information Technology Research Labs, NEC Corporation, Sep. 1989, pp. 735–741.

"Processing the New World of Interactive Media," Rathnam, The Trimedia VLIW CPU Architecture, Mar. 1998, pp. 108–117.

"Effective Cache Mechanism for Texture Mapping," IBM Technical Disclosure Bulletin, vol. 39, No. 12, Dec. 1996, pp. 213–217.

"Advanced Raster Graphics Architecture," XP–0021188066, pp. 890–893.

"Data–Format Conversion: Intel/Non–Intel," vol. 33, No. 1A, Jun. 1990, IBM Technical Disclosure Bulletin, pp. 420–427.

"Address Munging Support in a Memory Controller/PCI Host Bridge for the PowerPC 603 CPU Operating in 32–Bit Data Mode," IBM Technical Disclosure Bulletin, vol. 38, No. 09, Sep. 1995, pp. 237–240.

"One Frame Ahead: Frame Buffer Management for Animation and Real–Time Graphics," XP–000749898, Auel et al., Tektronix Inc., pp. 43–50.

"Efficient Alias–Free Rendering Using Bit–Masks and Look–Up Tables," Abram et al., The University of North Carolina at Chapel Hill, XP–002115680, Jul. 1985, pp. 53–59.

"A New Simple and Efficient Antialiasing with Subpixel Masks," Schilling et al., Computer Graphics, vol. 25, No. 4, Jul. 1991, pp. 133–141.

"A Multiprocessor System Utilizing Enhanced DSP's for Image Progressing," Ueda et al., XP 2028756, pp. 611–619.

"The Reyes Image Rendering Architecture," Cook et al., Computer Graphics, vol. 21, No. 4, Jul. 1987, pp. 95–102.

"The Accumulation Buffer: Hardware Support for High–Quality Rendering," Haeberli et al., Computer Graphics, vol. 24, No. 4, Aug. 1990, pp. 309–318.

"Advanced Animation and Rendering Techniques," Watt et al., ACM Press, New York, New York, pp. 127–137.

The A–Buffer, an Antialiased Hidden Surface Method, Carpenter, Loren, Computer Graphics, vol. 18, No. 3, Jul. 1984, pp. 13–18.

* cited by examiner

WIDE INSTRUCTION WORD GRAPHICS PROCESSOR

PRIORITY

This application claims priority from provisional U.S. patent application Ser. No. 60/093,165, filed Jul. 17, 1998, entitled "WIDE INSTRUCTION WORD GRAPHICS PROCESSOR" and bearing attorney docket number 1247/134, the disclosure of which is incorporated herein, in its entirety, by reference.

RELATED APPLICATIONS

In addition to those discussed above and below, this application is related to the following copending U.S. patent applications, each of which is incorporated herein, in their entireties, by reference and filed on even date herewith:

Application Ser. No. 09/354,083, filed Jul. 15, 1999 entitled, "GRAPHICS PROCESSING WITH TRANSCENDENTAL FUNCTION GENERATOR" naming Vernon Brethour and Stacy Moore as inventors; and Application Ser. No. 09/354,217, filed Jul. 15, 1999 entitled "GRAPHICS PROCESSING FOR EFFICIENT POLYGON HANDLING" naming Dale Kirkland and William Lazenby as inventors.

FIELD OF THE INVENTION

The present invention relates to computers, and more particularly to computers using very large instruction words for various purposes, including for graphics processing.

BACKGROUND OF THE INVENTION

In the implementation of graphics display systems for digital computers, it is sometimes desirable to have dedicated hardware support for geometry calculations in addition to the more common support for triangle setup and rasterization. Because graphics display systems often involve the display of objects based on three-dimensional data describing the objects, the geometry calculations involve, among other things, transforming locations of objects expressed in three-dimensional world coordinates into locations expressed in two-dimensional coordinates as the objects appear on the display. For some applications and configurations of graphics systems, the processing capability of the geometry accelerator becomes critically important. In the simplest case, geometry computations are accomplished one coordinate at a time, one vertex at a time, one triangle a time, one triangle strip at a time.

Data presented to a computer graphics subsystem are often expressed as strips of polygons (often triangles) in accordance with a graphics processing standard, such as the well known OpenGL graphics library. Rendering a scene involves transforming the coordinates of all of the polygons in all of the strips and determining the pixel values in the display that are associated with each portion of each of the polygons that appears in the display. The large amount of data involved in these calculations, in relation to the conflicting goals of achieving rendering both quickly and in detail, places heavy demands on computational resources.

Substantial opportunities exist for parallel computation by breaking up the triangle strips and presenting the resulting sub-strips to different computation engines in parallel. THE REALITY ENGINE, distributed by Silicon Graphics, Inc. of Mountain View, Calif., and the GLZ family of graphics accelerators, distributed by INTENSE 3D of Huntsville, Ala., are examples of systems that employ this technique extensively. In these systems, once the strips are broken up, the sub-strips are passed to standard processor elements, where the rest of the computation takes place basically one coordinate at a time, one vertex at a time. In the Reality Engine, these computations are done with an i860 processor from Intel. In the GLZ family of graphics accelerators, these computations are done with DSP chips from Analog Devices of Norwood, Mass. In systems like these, some limited parallelism takes place in the coordinate transformations because the computation engines employed are pipelined math units with separate engines for integer and floating point calculations.

In U.S. Pat. No. 5,745,125, assigned to Sun Microsystems, separate specialized computation engines are arranged in series to form a deeper pipeline than would normally occur.

It is a known goal in computer design to employ very large instruction words (VLIW) for achieving increased parallelism in computation. To make it practical to program such computers, high level programming languages are devised that employ instructions utilizing a register-to-register type of instruction set. The effect of a successful VLIW machine is to launch and complete a great many instructions on each clock cycle, so the register-to-register instruction set requires a register file with many read ports and many write ports. For example, U.S. Pat. No. 5,644,780, assigned to International Business Machines, describes a register file for VLIW with 8 write ports and 12 read ports. The result is a VLIW computation engine capable of high levels of parallelism, but which can be built only at great cost that requires many registers.

SUMMARY OF THE INVENTION

The present invention achieves high levels of parallelism in a graphics processor by providing in a first embodiment an apparatus for processing computer graphics requests utilizing a wide word instruction. The apparatus of this embodiment has 1. a graphics request input;
2. a processor, coupled to the graphics data input, having an output, and responsive to instructions, wherein each instruction is a wide word. In a further related embodiment, each instruction is a very wide word. In a further embodiment, each instruction is a super wide word. In a still further embodiment, each instruction is an ultra wide word. In a related embodiment, which may, but need not, employ an instruction that is a wide word, a very wide word, a super wide word or an ultra wide word, the processor has functional units producing n results per clock cycle and registers for storing not more than n/2 of such results. In a further related embodiment, the functional units are connected by a cross bar.

As used in this description and the accompanying claims, unless the context otherwise requires, the following definitions are employed. A "wide word" is an instruction, for a processor, that is issued in a single clock cycle of the processor, and providing greater than 64 bits of control to the processor. A "very wide word" is an instruction, for a processor, that is issued in a single clock cycle of the processor, and providing greater than 99 bits of control to the processor. A "super wide word" is an instruction, for a processor, that is issued in a single clock cycle of the processor, and providing greater than 128 bits of control to the processor. An "ultra wide word" is an instruction, for a processor, that is issued in a single clock cycle of the processor, and providing greater than 255 bits of control to the processor. A "register" is a storage element associated with a processor permitting reading of data on the processor clock cycle that immediately follows the clock cycle in which storage has been accomplished.

In another embodiment of the invention, there is provided a computer having data stores with multiple addressing modes. In this embodiment, the computer has 1. a data input;
2. a processor, coupled to the data input, and having an output and responsive to instructions; and
3. a plurality of data stores, coupled to the processor, each data store having a plurality of addressing modes, wherein a single instruction individually selects an addressing mode for each of the data stores.

The plurality of addressing modes may include indirect and absolute addressing modes. The indirect mode may further include a double level of indirect addressing. In a further embodiment, each instruction is a wide word. In a still further embodiment, there is provided a computer for processing computer graphics requests, wherein the data input is a graphics request input.

In another embodiment, there is provided a multiple processor apparatus for processing computer graphics requests in which the control store is accessed an increased clock rate in relation to the clock rate of the processors. In this embodiment, the apparatus has:

1. a plurality n of processors, n>1, each processor running at a processor clock rate R; and
2. a single control store supplying instructions for the processors, running at a store clock rate nR.

In a related embodiment, the processors are responsive to instructions, and each instruction is a wide word or (in a yet further embodiment) a super wide word. Another related embodiment also has a control store sequencer, for evaluating branch instructions, at a clock rate nR, so that each processor may be caused to branch without processor clock delay for evaluation of branch instructions.

Another embodiment of the invention provides an apparatus, for processing computer graphics requests, that uses a stack for storing instruction addresses arranged so as not to produce an overflow condition. This embodiment has 1. a graphics request input;
2. a processor, coupled to the graphics request input, and having an output and responsive to a set of instructions, the set including a call and a return;
3. a stack of n entries for storing instruction addresses, the stack having a top entry;
4. a program counter for addressing instructions and having a value for a current instruction, wherein
    i. each time a call is invoked, a number equal to one more than the value of the program counter is pushed onto the top of the stack and
    ii. each time a return is invoked, the top entry of the stack is popped off the stack and placed in the program counter;
5. wherein program execution is maintained even when the excess of calls over returns is greater than n, so that current entries in the stack may be abandoned by invoking an instruction stream that is independent of return addresses in the stack. In a further related embodiment, entries in the stack are addressed by a LIFO system.

In accord with another aspect of the invention, a graphics accelerator includes a vertex input for receiving vertex data, an output for forwarding processed data, and a processor coupled with the vertex input and output. The graphics accelerator also includes an instruction input that receives instructions for processing the vertex data received from the vertex input. The processor is responsive to wide word instructions.

In accordance with yet another aspect of the invention, a graphics accelerator includes a vertex input for receiving vertex data, a processor coupled with the input, and a set of registers for storing results produced by the processor. To that end, the processor includes a plurality of functional units that execute based upon a clock cycle. The plurality of functional units produce n results per each clock cycle. The set of registers includes no more than n/2 registers.

In preferred embodiments, n>1. Moreover, the graphics accelerator is responsive to a set of instructions that may include one of a plurality of wide words, super wide words, and ultra wide words.

BRIEF DESCRIPTION OF THE DRAWINGS

The foregoing features of the invention will be more readily understood by reference to the following detailed description, taken with reference to the accompanying drawings, in which.

DETAILED DESCRIPTION OF PREFERRED EMBODIMENTS

The following acronyms may be used in this description:

| | |
|---|---|
| ALU | Arithmetic Logic Unit. |
| BDU | Breaker-Distributor Unit. |
| BIC | Bus Interface Chip (Python). |
| CVB | Cougar Vertex Buffer. |
| CVF | Current Vertex File. |
| CVH | Cougar Vertex Handler. |
| CRS | Cougar Request Sequencer. |
| MAC | Multiplier-Accumulator. |
| PC | Program Counter. |
| PGU | Programmable Graphics Unit. |
| RC | Render Context. |
| SF | Scratch File. |
| VA | Vertex Assembly. |
| VRF | Vertex Register File. |
| VF | Vertex File. |
| WCS | Writeable Control Store. |

Figure 1:
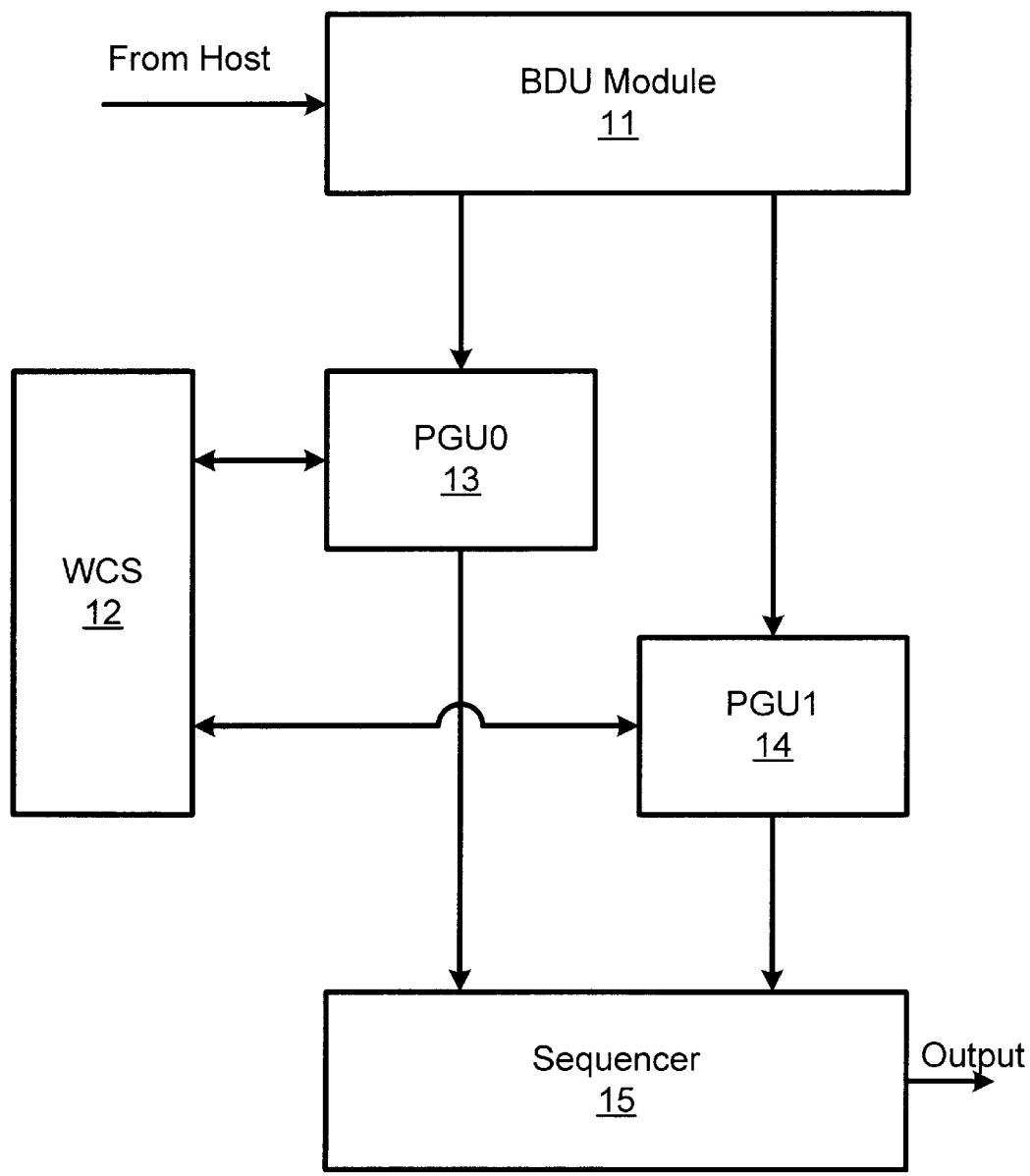
FIG. 1 is a block diagram of a graphics geometry accelerator in accordance with a preferred embodiment of the invention.

FIG. 1 shows a block diagram of a graphics geometry accelerator arranged in accordance with a preferred embodiment of the invention. The accelerator of this embodiment has been developed under the code name "Tomcat" and is sometimes referred to in this description by that name. The accelerator takes graphics request data defining strips of polygons from a host computer in accordance with a standard such as OpenGL and transforms the data from world coordinates to display coordinates. The Tomcat accelerator may be used to furnish data to a graphics processor, which performs rasterization and texture processing—that is, translating the transformed polygon data into pixel values associated with a display and overlaying any textures associated with objects in the displayed image. The Tomcat accelerator is designed to operate in conjunction with a graphics processor developed by the assignee of the present invention under the code name "Cougar" and that graphics processor is sometimes referred to in this description by that name. Details of the Cougar graphics processor are disclosed in pending provisional U.S. patent application Ser. No. 60/093, 247, and copending U.S. patent application Ser. No. 09/353, 695 entitled, "MULTI-PROCESSOR GRAPHICS ACCELERATOR", filed on even date herewith, assigned attorney docket number 1247/A22, and naming Steven Heinrich, Mark Mosley, Clifford Whitmore, James Deming, Stewart Carlton, Matt Buckelew, and Dale Kirkland as inventors. Both such application are incorporated, in their entireties, by reference.

FIG. 1 shows a Breaker-Distributor Module (BDU) 11, which receives graphics request data from the host computer. The BDU takes the incoming strips of polygons, and, to the extent necessary, breaks the strips into substrips and distributes the substrips for processing. The substrips are passed to a pair of Programmable Graphics Units (PGUs) 13 and 14, which are identified as PGU 0 and PGU 1. Each PGU performs the required data calculations for the substrips distributed to it, operating pursuant to instructions stored in the Writeable Control Store (WCS) 12. The outputs of the respective PGUs 13 and 14 are then appropriately interleaved by sequencer 15 to permit processing by a Cougar graphics processor. It is possible to employ a plurality of Tomcat processors simultaneously, in which case the BDU associated with each processor is coupled to the host computer and thus each BDU receives all graphics requests from the host. Each BDU processes graphics requests to the extent required to maintain the current global rendering context. However, a given BDU forwards data to its associated PGUs when it is the turn of the given BDU to do so. In this manner the BDUs collectively forward data on a peer-to-peer round robin basis. See also copending U.S. patent application Ser. No. 09/353,912 entitled "Graphics Processing System with Multiple Strip Breaks", filed on even date herewith, and naming William S. Pesto, Russell Schroter, and David Young as inventors, the disclosure of which is incorporated herein, in its entirety, by reference.

Figure 2:
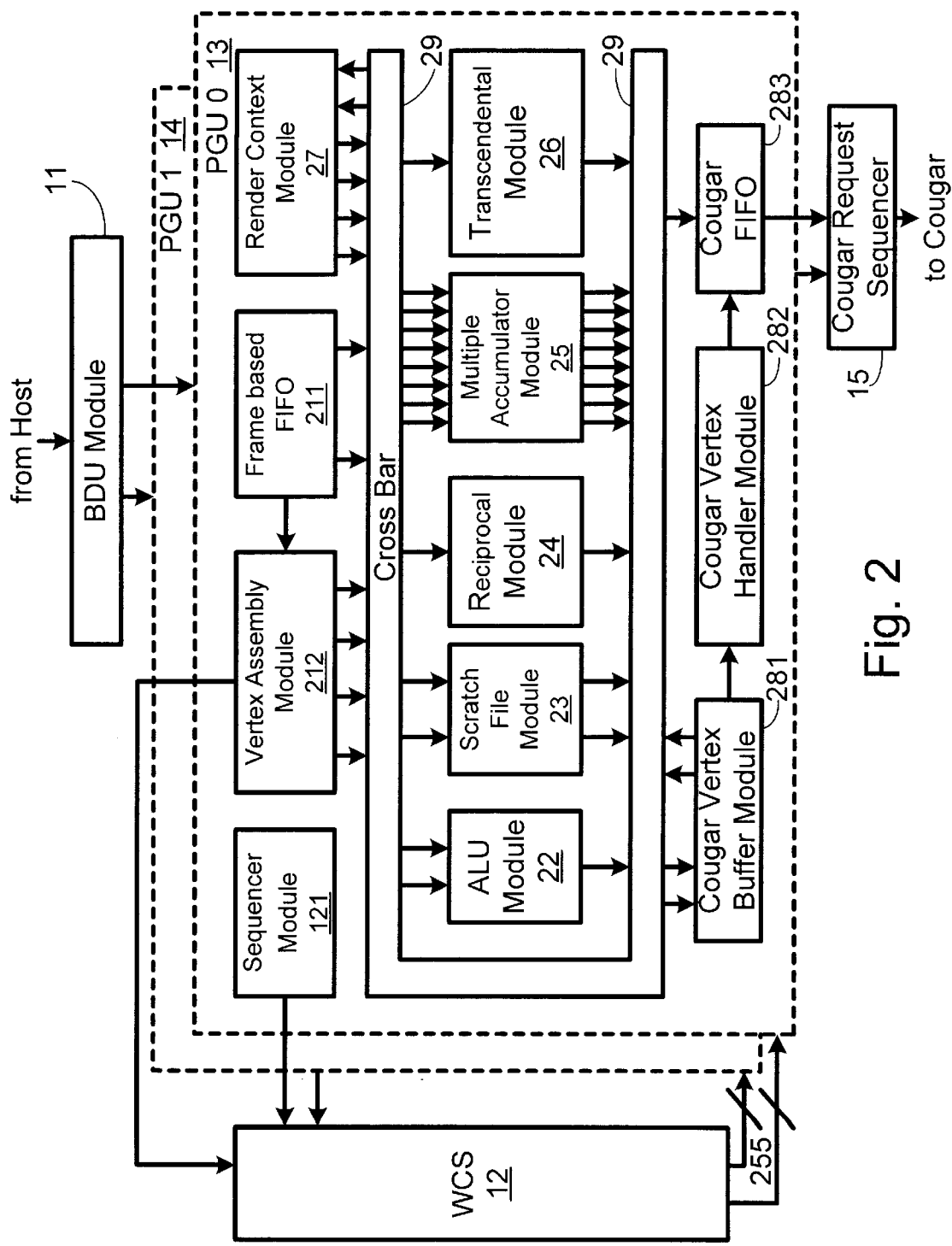
FIG. 2 is a more detailed diagram of the embodiment of FIG. 1.

FIG. 2 is a more detailed diagram of the embodiment of FIG. 1 showing the BDU module 11, the WCS 12, the PGUs 13 and 14, and the sequencer 15 (identified here as the Cougar Request Sequencer). In addition, further detail of the PGU is shown. Although the detail is shown for PGU 0, PGU 1 has the same configuration. A sequencer module 121 controls the flow of the instruction stream to the PGU from the WCS 12. In order to achieve high data throughput, the PGUs utilize "wide word" instructions as defined above. In fact, in this embodiment, each instruction is 256 bits wide, qualifying for the status of "ultra wide word". Surprisingly, we have found that the architecture described herein permits the use of ultra wide word instructions without the need for a higher level language to produce machine level instructions for operation of the PGUs. In other words, we have found that ultra wide word instructions can be manually prepared at the machine level to guide operation of the PGUs to perform the limited number of calculations used for graphics geometry acceleration. The limited number of calculations required, therefore, has made it possible to utilize ultra wide word instructions without the need for a compiler written for a higher level language, and therefore without the development expense and complexity associated with a machine for which a compiler would be written.

In FIG. 2 and associated with the PGU are shown a collection of items that make up the calculation engine and Input/Output handler of the PGU, including a frame-based FIFO 211, Vertex Assembly Module 212, Arithmetic Logic Unit (ALU) Module 22, Scratch File Module 23, Reciprocal Module 24, Multiplier Accumulator Module 25, Transcendental Module 26, Cougar Vertex Buffer Module 281 (feeding Cougar Vertex Handler Module 282), and Cougar FIFO 283. These items can pass data to and from each other via the cross bar 29, to which they are all connected. As a result, during each clock cycle, each of the items can be handling data in parallel in accordance with the current instruction from the WCS that is accessed by the Sequencer Module 121.

We have found that we can efficiently utilize a single control store, namely WCS 12, to serve both PGUs (i.e., PGU 0 and PGU 1), by running the clock of the control store WCS at twice the frequency of the PGU clocks. Then, to prevent conflicting accesses of the WCS by the PGUs, the PGU clocks are run 180 degrees out of phase with respect to each other. Similarly, the Sequencer module 121 for each PGU is run at the same clock rate as the WCS, so that it may evaluate branch instructions in a manner that each PGU can be caused to branch without processor clock delay attributable evaluation of branch instructions. More generally, a number n of PGUs may be utilized in a graphics processor, and each PGU may run at a clock rate R. In such a case, the n PGUs may employ a single control store supplying instructions at a clock rate nR. In a similar manner, each PGU may employ a control store sequencer, for evaluating branch instructions, running at a clock rate nR, so that each processor can be caused to branch without processor clock delay for evaluation of branch instructions.

The Sequencer 121 utilizes a stack for storing instruction addresses. Normally, it is possible in using such a stack to produce an overflow condition, but we have found that one can beneficially provide a stack that does not produce an overflow condition. For example, we have found it convenient to use the control store 12 to store about 4000 lines of ultra wide words. The Sequencer Module employs a stack of eight 12-bit addresses. A program counter (PC) addresses the instructions in the WCS 12 and has a value for the current instruction. Each time a call is invoked, a number equal to one more than the value of the program counter is pushed onto the top of the stack. Each time a return is invoked, the top entry of the stack is popped off the stack and placed in the program counter. When in the course of execution of the program, the excess of calls over returns is greater than eight (the number of entries in the stack in this example), program execution is maintained. When this condition occurs, current entries in the stack may be abandoned by invoking an instruction stream that is independent of return addresses in the stack. Entries are addressed by a LIFO system.

Turning now to the other items in the PGU of FIG. 2, the Frame-Based FIFO is the source for all data from the BDU Module 11. The Vertex Assembly Module 212 is coupled to the Frame-Based FIFO 211 and performs in accordance with a current request header. In the case of a vertex header, the Vertex Assembly Module 212 builds the next vertex into one of four Vertex Files, which are part of the Vertex Assembly Module. The Vertex Files render the vertices therein available for processing. The request header can also specify two other major tasks: processing of non-vertex headers from the BDU and (in a surprising usage) loading instructions into the WCS 12. See also copending U.S. patent application Ser. No. 09/353,432, entitled "System for Processing Vertices From a Graphics Request Stream", filed on even date herewith and naming Vernon Brethour and William Lazenby as inventors, the disclosure of which is incorporated herein, in its entirety, by reference.

Writeable Control Store loading occurs when a Load WCS Request is being processed. The BDU Module 11 sends the request header to all PGUs, but only the master PGU receives the Control Store data. The slave PGU processes the Load WCS Request header by waiting for the software to execute a REQ sequencer instruction and then notifying the master PGU that it is ready for the WCS to be loaded. The master PGU waits for the software to execute a REQ sequencer instruction and for the slave PGU to notify that it is ready. The master PGU updates the WCS and then acknowledges that the slave can resume. The request is unloaded from the Frame Based FIFO by the Vertex Assembly Control Module 212. When the Vertex Assembly Control Module 212 is loading instructions into the Writeable Control Store (WCS) or processing vertex headers, the Frame Based FIFO 211 is controlled by the Vertex Assembly Control Module.

There are 4 sources for each of two ports (A and B) into the ALU as listed below.

| A Port | |
|---|---|
| Register File | Contains sixteen 40-bit register values. |
| Constants | Contains thirty-two 40-bit register values. |
| A Port Register | Contains the data selected bu the ALU A Select on the previous clock. |
| B Port Register | Contains the data selected bu the ALU B Select on the previous clock. |
| B Port | |
| Register File | Contains thirty-two 40-bit register values. |
| Utility Registers | Accesses one of the utility registers used for controlling other modules. |
| A Port Register | Contains the data selected bu the ALU A Select on the previous clock. |
| B Port Register | Contains the data selected bu the ALU B Select on the previous clock. |

The ALU Module 22 is capable of performing operations typical of ALUs, including bitwise inversion, bitwise logical AND, logical OR, exclusive OR, logical shifts, minimum and maximum of two numbers, addition, subtraction, etc. The output register that is driven onto the cross bar is always updated. The output of the ALU can also be written into either the register file or one of the utility registers as specified by the target C address. This target register is updated immediately, and may be used as a source operand of an ALU operation on the following clock.

The Multiplier Accumulator Module (MAC) 25 performs multiplication and addition on eight 40-bit floating point inputs A–H provided on each cycle. The following seven results are produced on the specified ports.

| A*B | MAC Port J |
|---|---|
| C*D | MAC Port L |
| E*F | MAC Port N |
| G*H | MAC Port P |
| A*B+C*D | MAC Port K |
| E*F+G*H | MAC Port O |
| A*B+C*D+E*F+G*H | MAC Port M |

The MAC GH CTRL signal selects whether the G*H result (if ctrl is clear) or zero (if set) is used as input to the right side accumulator. This permits the G*H multiplier to be used separately while the MAC still accumulates the results of three multiplies on MAC Port M. With the MAC GH CTRL signal set, MAC Ports O and M therefore produce the following:

| E*F | MAC Port O |
|---|---|
| A*B+C*D+E*F | MAC Port M |

The Reciprocal Module 24 computes the reciprocal of the floating point number provided as an input. The Transcendental Module 26 performs one of the following functions on the floating point number specified as input:

| EXP | Exponential (Base 2) |
|---|---|
| LOG | Logarithm (Base 2) |
| ISQ | Inverse Square Root |

The Render Context (RC) Module 27 is a general purpose memory unit which contains 1024 32-bit words of data. It has two pairs of read ports, and one pair of write ports. A single address (and associated RC Pointer Register) drives each pair, with one port accessing the contents of the specified address addr, and the second port accessing addr XOR 1. Absolute addresses may be specified in the WCS control word. Indirect addressing is done by adding the offset specified in the least significant 5 bits of the corresponding RC Address field to the RC Pointer register for a particular port. The resulting address is latched and may be used to drive the address into the Render Context RAM on the next cycle. It may also be written back into the RC Pointer register if the Ptr Inc bit is set on the cycle that the offset is specified. The three RC Pointer registers may also be loaded directly by the ALU unit, which takes precedence over any updates attempted by the Pointer increment logic above. When reading from the RC, the data is available on the crossbar on the cycle after the instruction which specified the address and/or addressing mode. Sneak paths are provided from read ports A, B, C, and D to MAC Input Ports A, C, E, and G respectively that permit the data to be used as input to the MAC on the same cycle as the address is specified. When writing to the RC, the data is latched on the cycle that it and its address are presented, but is not written to the render context RAM until the next cycle. The new data may not be accessed until the 2nd cycle after it is written.

The Scratch File Module 23 is a fast, general-purpose memory unit containing 256 40-bit words of data. It has two independent read ports and two independent write ports which use 8 bit addresses. The various addressing modes are described below. Data read from the scratch file is available for use on the same clock cycle as the read instruction is issued. Any register used to form an address or to select an entry out of the Frame Index (described below) must have been written at least one clock prior to its being used to access the Scratch File. Data written to the Scratch File is latched on the cycle that the write is specified, but is not written to the Scratch File Memory itself until the end of the following cycle. Special latch registers and logic are built in that detect a read from a location that is in the process of being updated. This logic watches for a read address on port C (D) being the same as the previous cycle's write address on port A (B), and returns the latched data instead of the contents of memory. If the read address on C matches the previous write address on B, then memory is read, and the old value is returned as the result of the read. The logic only compares the A/C and B/D port pairs.

Addressing Modes

Each Scratch File port has control word fields which determine the addressing mode used to access the Scratch File on a given cycle. The following addressing modes are provided:

| | |
|---|---|
| Absolute | The complete 8 bit address is specified in the WCS control word SF_ADDR field. |
| Indirect | The contents of the Scratch File register for that port is used as the 8 bit address. |
| Register: Offset | The contents of the Scratch File register is used as the upper 4 bits of the address, and the lower 4 bits of the SF_ADDR control word field is used as the lower 4 bits, forming a complete 8 bit address. The register is in effect selecting one of sixteen frames within the Scratch File. The offset selects one of the sixteen words within that frame. |
| Offset: Register | The reverse of Register:Offset mode. The Offset provides the upper 4 bits, and the register the lower 4 bits of the address. |
| Frame: Offset | The selected output from the Frame Index array is used as the upper 4 bits of the address, and the offset specified in the instruction is used as the lower 4 bits. |
| Frame: Register | The selected output from the Frame Index array is used as the upper 4 bits of the address, and the specified register is used as the lower 4 bits. |
| Register: Register | Only available on ports B and C. Bits 7:4 of Scratch File Pointer B (or C) are used as the upper four bits of the address, and bits 3:0 of Scratch File Pointer A (or D) are used as the lower four bits of the address. |

The Scratch File Module 23 includes a Frame Index, a special purpose array of 18 4-bit numbers that can be used to generate the upper four bits of the Scratch File addresses. The 256 word Scratch File can be thought of as 16 frames of 16 words each. This requires 4 bits to address a particular frame, and then 4 more bits to address a single word within that frame. The Frame Index Array is manipulated by the ALU Frame Index operations and the SF B Index and SF C Index utility registers. The least significant 5 bits of the B and C SF Pointer registers control the output of the Frame Index B and C ports respectively. These Frame Index outputs can then be selected as one of the inputs to a high MUX (i.e., the MUX selecting the upper four bits of the address) of each Scratch File Address. When either SF B Index or SF C Index is specified as the target of an ALU operation, regardless of that operation, the least significant 4 bits of the B operand are written into the Frame Index Array at the location addressed by SF Pointer B or C register respectively. The previous contents of that Frame Index location are overwritten.

Each Tomcat PGU contains a Cougar Vertex Buffer Module 281 having six independent Cougar Vertex Buffers (CVBs). Each CVB contains data that the Cougar Vertex Handler Module 282 extracts and sends to the Cougar FIFO 283, forming a valid Cougar vertex request. Only one CVB may be addressed at a time by the crossbar. The CVSEL utility register contains a three bit value that is used to address one of the six CVBs. There are two independent write ports, and two independent read ports to the currently selected CVB. Each port is controlled by a 5-bit address which selects one of the 32 words in the CVB. When writing to the CVB, the data is latched on the cycle that it and its address are presented, but is not written to the specified buffer until the next cycle. The new data may not be accessed until the 2nd cycle after it is written. When reading from the CVB, the data is available on the crossbar on the cycle after the instruction which specified the address and/or addressing mode.

The Cougar Vertex Handler Module 282 is responsible for copying the relevant pieces of data from a specified CVB to the Cougar FIFO 283. It is controlled by requests that it pulls from its request FIFO, discussed below. If there are no requests for it to process, then it remains idle, waiting for a new request to be written into the request FIFO. The request FIFO contains requests for the Cougar Vertex Handler. It is 3 words deep, with each word being 24 bits wide. The Request FIFO is written to one word at a time by the ALU via a utility register.

The Cougar FIFO 283 of each PGU feeds the Cougar Request Sequencer 15, which is responsible for transferring Cougar bound data from each PGU to the Cougar Graphics Accelerator in the same order as the requests originally came into the Tomcat BDU.

In preferred embodiments, each PGU executes clipping operations to ensure that an object is within a viewing volume. Details of preferred clipping operations are discussed in U.S. provisional patent application serial No. 60/093,184, the disclosure of which is incorporated, in its entirety, by reference.

By way of example, the ALU 22 preferably includes one or more hardware clipping modules that cooperate to store a single list of vertices in the scratch file module 23. This list is identified above as the file index array. Specifically, each vertex in a given triangle is checked to determine whether it is within a given view volume. To that end, the clipping modules initially store the initial three vertices in the index list array. Each initial vertex, and each newly determined vertex, then is clip checked to determine if it is within the given view volume. One or more new vertices, if any, are added to the list as they are calculated, while initial vertices are deleted from the list if determined to be outside the given view volume. As a result of these clipping operations, a single list is produced identifying the successive vertices of a resultant polygon formed within the given view volume. Examples of this process are disclosed in the immediately preceding above referenced provisional patent application.

In preferred embodiments, the index array includes two pointers to vertices. This size of the array may be equal to one more than the maximum number of vertices that can be active at any one point during the clip check process. This is dependent upon the number of vertices in the original triangle, and the maximum number of active clipping planes. The above noted two pointers are provided to address the array, along with read capability and INSERT and DELETE instructions.

INSERT is given a new value to insert, and which pointer to use as the insertion point. All entries at the location addressed by the specified pointer and beyond are shifted up by one location, and the new value is inserted at the location addressed by the specified pointer. DELETE is given a pointer to use as the deletion point. The entry at the addressed location is deleted, and all subsequent entries are shifted down by one location.

Figure 3:
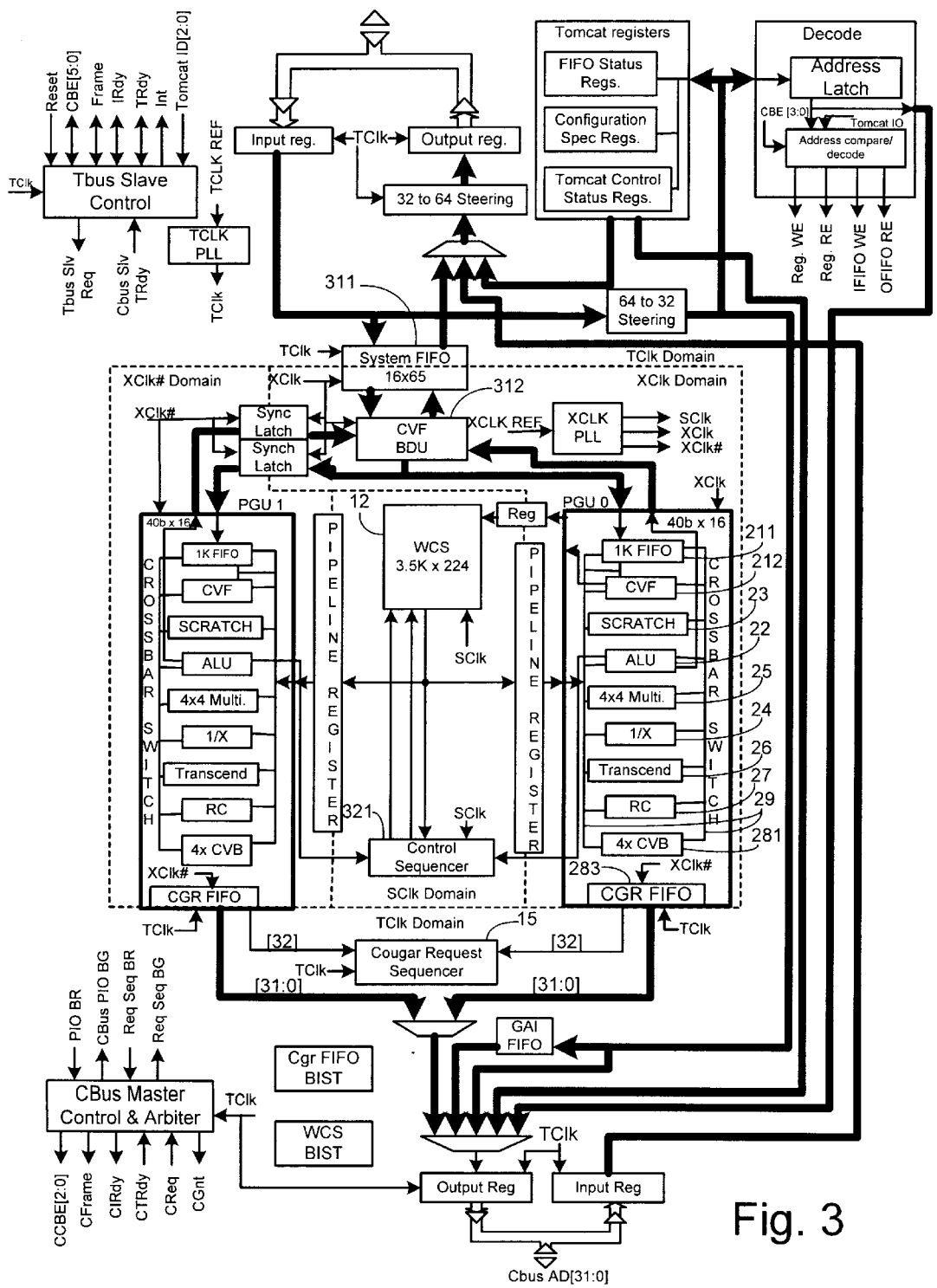
FIG. 3 is a diagram showing yet further detail of the embodiment of FIG. 1.

FIG. 3 is a diagram showing yet further detail of the embodiment of FIG. 1. In this diagram, data flow through the accelerator is emphasized. In this figure, control sequencer 321 schematically represents the sequencer module 121 of on each PGU of FIG. 2. The BDU module 11 of FIG. 2 is here shown to include both system FIFO 311 and BDU 312.

Of course, it should be noted that although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

As discussed previously the highly parallel arrangement of the modules in FIGS. 2 and 3 permits use of a 256 bit ultra wide instruction word. Each word includes bits as described on the following five pages:

A possible bit assignment for a geometry accelerator control word:
Bits 0–2: Sequencer operation.
Bit 3–6: Condition Code Select.
Bit 7: Condition Code Invert.
Bit 8: ALU Condition Code write.
Bit 9: FPU Condition Code write.
Bits 10–11: Sequencer Loop Control.
Bit 12: Push PC
Bit 13: Headstart Qualify
Bits 14–25 Branch Field (also used as Immediate Field bits 0 through 11)
Bits 26–30 Cougar Vertex Buffer port A address (also used as Immediate Field bits 12 through 16)
Bits 31–34 Cougar Vertex Buffer port A select (also used as Immediate Field bits 17 through 20)
Bits 35–39 Cougar Vertex Buffer port B address (also used as Immediate Field bits 21 through 25)
Bits 40–43 Cougar Vertex Buffer port B select (also used as Immediate Field bits 26 through 29)
Bits 44–48 Cougar Vertex Buffer port C address (also used as Immediate Field bits 30 through 34)
Bits 49–53 Cougar Vertex Buffer port D address (also used as Immediate Field bits 35 through 39)
Bit 54: Cougar Vertex Buffer port A write enable
Bit 55: Cougar Vertex Buffer port B write enable
Bits 56–61 ALU Opcode
Bit 62: Signal bit visible to the other PGU
Bits 63–66 ALU X-Bar input A select
Bits 67–72 ALU argument A select
Bits 73–76 ALU X-Bar input B select
Bits 77–82 ALU argument B select
Bits 83–88 ALU argument C (destination) select
Bits 89–96 Scratch File port A address
Bit 97: Scratch File port A write enable
Bits 98–101 Scratch File port A select
Bits 102–109 Scratch File port B address
Bit 110: Scratch File port B write enable
Bits 111–114 Scratch File port B select
Bits 115–118 Scratch File port A address increment control
Bits 119–123 Scratch File port B address increment control
Bits 124–131 Scratch Pile port C address
Bits 132–136 Scratch File port C address increment control
Bits 137–144 Scratch Pile port D address
Bits 145–148 Scratch File port D address increment control
Bits 149–152 Reciprocal Unit input select.
Bits 153–154 Transcendental Unit input select.
Bits 155–156 Transcendental Unit function (lookup table) select.
Bits 157–160 Multiply Accumulate Unit input A select
Bits 161–164 Multiply Accumulate Unit input B select
Bits 165–168 Multiply Accumulate Unit input C select
Bits 169–172 Multiply Accumulate Unit input D select
Bits 173–176 Multiply Accumulate Unit input E select
Bits 177–180 Multiply Accumulate Unit input F select
Bits 181–184 Multiply Accumulate Unit input G select
Bits 185–188 Multiply Accumulate Unit input H select
Bit 189-Multiply Accumulate mode control
Bits 190–197 Input Buffer port A offset
Bit 198 Input Buffer port Advance control
Bits 199–206 Input Buffer port B offset
Bit 207-Input Buffer port B advance control
Bit 208-Input Buffer global advance
Bits 209–218 Render Context ports A&B address (A is even & B is odd)
Bits 219–220 Render Context ports A&B address advance control
Bits 221–230 Render Context ports C&D address (C is even & D is odd)
Bits 231–232 Render Context ports C&D address advance control
Bits 233–242 Render Context. ports E&F address (F is even & F is odd)
Bits 243–244 Render Context ports E&F address advance control
Bits 245–248 Render Context port E input select
Bit 249 Render Context port B write enable
Bits 250–252 Render Context port F input select
Bit 253 Render Context port F write enable
Bit 254 Diagnostic trigger to interface
Bit 255 ALU X-Bar output power down A Crossbar connects all of the functional units to each other. The mux on each input port controls which of several possible sources is latched into that port on a given cycle. Table 0–1 provides an overview of all the sources and to which ports they are available.

Each row of the table represents one source, and each column represents one of the muxs located on a particular functional units input port. There are 24 ports driving outputs onto the crossbar, but the input Muxs may also select hardwired values, sneak paths, or immediate values, so there are a total of 42 possible inputs.

"X" indicates possible input sources, and blanks indicate no possible connection.

TABLE 0-1

| Units | RC | | S. File | | ALU | | R | T | Mac | | | | | | | | CVB (FIFO) | |
|---|---|---|---|---|---|---|---|---|---|---|---|---|---|---|---|---|---|---|
| Sources | E | F | A | B | A | B | A | A | A | B | C | D | E | F | G | H | A | B |
| FIFO A | X | | X | | X | | | | X | | X | X | | X | | X | | |
| FIFO B | | X | | X | | X | | | | X | | X | | X | | X | X | X |
| VFA | X | | X | | X | | | | X | X | | | | | X | | X | |
| VFB | | X | | X | | X | | | | | X | X | | X | | X | X | X |
| VFC | X | | X | | X | | | | X | | X | | X | X | X | | X | |
| VFD | | X | | X | | X | | X | | X | | X | | | X | X | | X |
| VFA (sneak) | — | — | — | — | — | — | — | — | — | X | — | — | — | — | — | — | — | — |
| VFB (sneak) | — | — | — | — | — | — | — | — | — | — | X | — | — | — | — | — | — | — |
| VFC (sneak) | — | — | — | — | — | — | — | — | — | — | — | — | X | — | — | — | — | — |

TABLE 0-1-continued

Crossbar/Input Sources

| Units | RC | | S. File | | ALU | | R | T | Mac | | | | | | | | CVB (FIFO) | |
|---|---|---|---|---|---|---|---|---|---|---|---|---|---|---|---|---|---|---|
| Sources | E | F | A | B | A | B | A | A | A | B | C | D | E | F | G | H | A | B |
| VFD (sneak) | — | — | — | — | — | — | — | — | — | — | — | — | — | — | — | X | — | — |
| RCA | X | | X | | X | | | X | X | X | | | X | | | | X | |
| RCB | | | X | | | X | | | | | X | X | X | X | | | | X |
| RCC | X | | X | | X | X | X | | X | | X | X | X | X | | | X | |
| RCD | | | X | | | X | | | | X | | | | | X | X | | X |
| RCA (sneak) | — | — | — | — | — | — | — | — | X | — | — | — | — | — | — | — | — | — |
| RCB (sneak) | — | — | — | — | — | — | — | — | — | — | X | — | — | — | — | — | — | — |
| RCC (sneak) | — | — | — | — | — | — | — | — | — | — | — | X | — | — | — | — | — | — |
| RCD (sneak) | — | — | — | — | — | — | — | — | — | — | — | — | — | — | X | — | — | — |
| Tran | X | | X | | X | | X | | | X | | X | | X | X | | | |
| Tran (sneak) | — | — | — | — | — | — | — | — | — | — | — | — | — | X | — | — | — | — |
| Recip | X | | | X | | X | — | | X | | X | | X | | X | | X | |
| Recip (sneak) | — | — | — | — | — | — | — | X | — | — | — | — | — | — | — | — | — | — |
| Alu C | X | | X | X | — | — | X | X | X | X | X | X | X | X | X | X | X | X |
| Alu Latch A | — | — | — | — | X | — | — | — | — | — | — | — | — | — | — | — | — | — |
| Alu Latch B | — | — | — | — | — | X | — | — | — | — | — | — | — | — | — | — | — | — |
| SF C | X | | X | | X | | X | | X | X | X | X | X | X | X | X | X | |
| SF D | | X | | X | | X | | X | X | X | X | | X | | | X | X | X |
| Mac J (0) | X | | X | | X | | | | X | | X | | | | | X | | |
| Mac K (4) | X | | X | | X | | X | | X | X | X | | X | | | | X | |
| Mac L (1) | | X | | X | | X | | | | X | | X | X | | | | | |
| Mac M (6) | X | | X | X | X | | X | X | X | X | | | X | X | X | | X | |
| Mac N (2) | X | | X | | X | | | | | | | | X | | X | | | |
| Mac O (5) | | X | | X | | X | X | X | | | | | X | X | X | X | X | X |
| Mac P (3) | | X | | X | | X | | X | | | | | X | | X | | | |
| Mac P (sneak) | — | — | — | — | — | — | — | X | — | — | — | — | — | — | — | — | — | — |
| CVB C | X | | X | | X | | X | | X | | X | X | | X | X | X | | |
| CVB D | | X | | X | | X | | | | X | | X | | X | | X | | X |
| Immediate | — | — | — | — | X | — | — | — | — | — | — | — | — | — | — | — | — | — |
| 0 (Zero) | X | | X | X | — | — | — | | X | | X | | X | | X | | | |
| 1.0 (One) | X | | | X | — | — | — | | X | X | X | X | X | X | X | X | | |
| −1.0 (MinusOne) | | X | | | — | — | — | | | X | | X | | X | | X | | |
| 0x7FA00001 | | | | | | | | | | | | | | | | | X | |
| # Inputs Used: | 16 | 8 | 15 | 15 | 14 | 14 | 8 | 8 | 16 | 16 | 16 | 16 | 16 | 16 | 16 | 16 | 16 | 8 |

We claim:

1. An apparatus for processing computer graphics requests, comprising:

a graphics request input;

a plurality of specialized geometry processors, coupled to said graphics input, having an output, and responsive to instructions, wherein each instruction is a wide word; and a writeable control store coupled to said processors, wherein said processors running on different clock phases communicate with said writeable control store in alternating cycles, whereby a high level of parallel processing is obtained.

2. Apparatus according to claim 1, wherein each instruction is a very wide word.

3. Apparatus according to claim 1, wherein each instruction is a super wide word.

4. Apparatus according to claim 1, wherein each instruction is an ultra wide word.

5. Apparatus according to claim 1, wherein the plurality of geometry processors producing n results per clock cycle and having registers for storing not more than n/2 of such results.

6. Apparatus according to claim 1, wherein said processors are interleaved to handle the same input.

7. Apparatus according to claim 1, wherein said apparatus comprises two processors, said processors communicating with said control store on clock cycles that are 180 degrees out of phase with respect to one another.

8. An apparatus for processing computer graphics requests, comprising:

a writeable control store connected to a plurality of geometry processors, wherein said geometry processors running on different clock phases access said control store at different times and operate in parallel pursuant to instructions in said control store, during a control load cycle only one of the plurality of geometry processors updates the writeable control store.

9. The apparatus of claim 8, wherein said geometry processors operate on different graphics data, said data being divided among said geometry processors.

10. The apparatus of claim 8, wherein at least one of said instructions is a wide word.

11. An apparatus for processing computer graphics requests, comprising:

a plurality of parallelized geometry processors running on different clock phases in a graphics processing subsystem having interleaved access to a common control store, wherein an access to update the common control store is performed by only one of the plurality of parallelized geometry processors.

12. The apparatus of claim 11, wherein data on which said geometry processors operate is divided among said processors.

13. The apparatus of claim 11, wherein said control store contains wide word instructions.

* * * * *